F. L. DYER.
MOTION PICTURE PROJECTING MACHINE.
APPLICATION FILED JUNE 11, 1914.
1,242,428.
Patented Oct. 9, 1917.
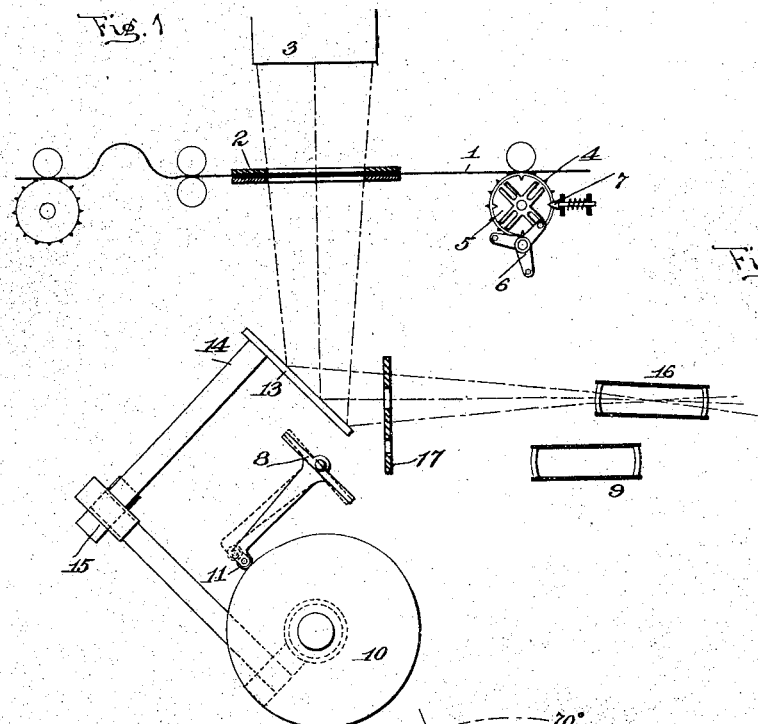
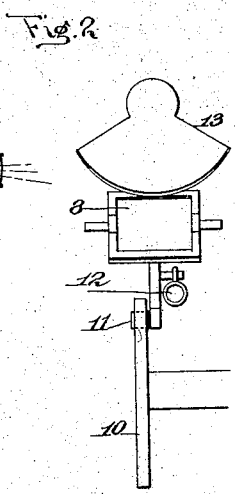
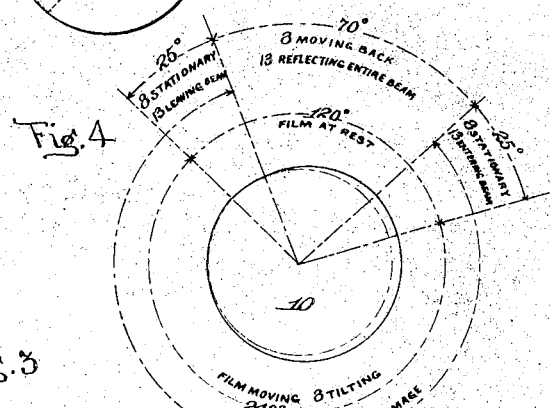
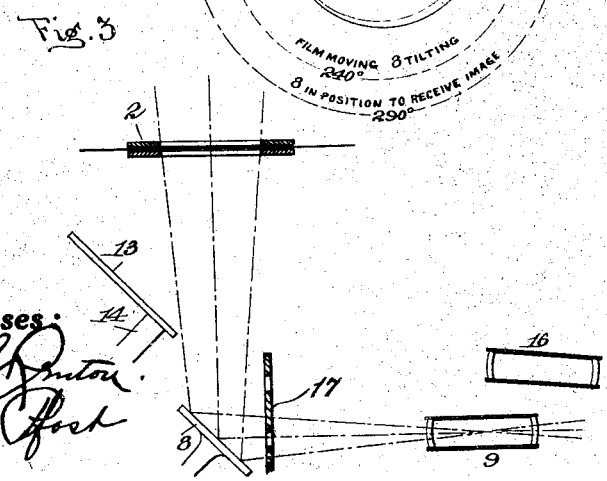
Witnesses:
Inventor
Frank L. Dyer

UNITED STATES PATENT OFFICE.

FRANK L. DYER, OF MONTCLAIR, NEW JERSEY.

MOTION-PICTURE-PROJECTING MACHINE.

1,242,428. Specification of Letters Patent. Patented Oct. 9, 1917.

Application filed June 11, 1914. Serial No. 844,431.

*To all whom it may concern:*

Be it known that I, FRANK L. DYER, a citizen of the United States, residing in the city of Montclair, county of Essex, and State of New Jersey, have invented a certain new and useful Improvement in Motion-Picture-Projecting Machines, of which the following is a specification.

My invention relates to improvements in motion picture projecting machines, of the type wherein reflectors are used for intercepting the beam of light between the film and objective. With machines of this broad type, as heretofore suggested, the film is moved continuously and reflectors have been used for the purpose of compensating for the movement of the film, but great difficulty has been experienced in so designing and operating reflectors that, while precisely compensating for the movement of the film, they will preserve the necessary constancy of the optical factors entering into the problem. Where the optical and mechanical factors have been properly taken care of the arrangements have been relatively complicated and expensive, and hence liable to derangement.

With such prior machines also a considerable number of mirrors, or reflectors, have been used, introducing into the problem the further difficulty of accurately matching the reflectors and increasing the number of parts that are liable to derangement, it being understood of course that with a machine that deals with so great an enlargement as a motion picture projector very slight inaccuracies become greatly exaggerated in the projected picture.

With some of the prior machines of this type, furthermore, where the attempt has been made to solve the difficulties by less complicated arrangements, the light beam is intercepted more than once, thereby greatly increasing the loss of illumination and definition.

The difficulties referred to have so far prevented a successful commercial introduction of reflecting machines, notwithstanding the substantial advantages of a machine of this type in eliminating or greatly reducing flicker, in reducing wear on the film, in reducing the light required, and in permitting slow speeds of projection. In consequence practically all projecting machines are of the intermittent feed type in which the film is fed with a series of violent jerks during which it is masked by a shutter and is maintained stationary for as long a portion of the time as possible, thereby subjecting the film to enormous wear, quickly racking and wearing out the mechanism and producing objectionable flicker.

With my improved machine I utilize the best features of intermittent and reflecting machines, and produce a projector having many practical advantages. With my improved machine I use only two reflecting surfaces which can be accurately matched, and I use only a single reflection, so that there is a minimum loss of light. The mounting of the reflectors is simple and effective, and provides a minimum opportunity of derangement. I secure all the advantages of reflecting machines in providing for constant illumination of the film, and therefore absence of flicker. Thus I am able to operate the film at any desired speed, permitting pictures to be taken at a slower rate of speed than at present, and also permitting effects in projection to be secured by changing the speeds of projection that are quite impossible with intermittent feed machines.

With my improved machine the film is fed intermittently, but as distinguished from ordinary intermittent feed machines, I provide for longer periods of movement than of rest, and I also preferably arrange the feeding mechanism in such a way that the feeding movement starts very slowly and gradually accelerates to the maximum, and finally dies out gradually, so that the film will come to rest and start from rest without shock or vibration.

By employing a feeding movement of this kind, while there is slightly more wear on the film than when it is fed continuously, yet the wear on the film as compared with an ordinary intermittent feed machine is very substantially reduced. With my improved machine I make use of a reflector whose angle is automatically changed so as to compensate for the movement of the film during the feed movement, and thereby hold the image stationary on the screen. I also make use of a bodily movable reflector which enters the beam of light and reflects the image during the time the film is stationary, and whose angle therefore does not change. Preferably the two reflectors are so coördinated that the movable reflector also acts as a shutter to mask the tilting reflector during the time that the latter is moved back to its initial position to receive and reflect the succeeding image. The two reflectors are also preferably so coördinated that after the film has come to rest the stationary image will be projected by the tilting reflector for a brief instant, during which time the tilting reflector will of course be held stationary, and during this instant when the tilting reflector is held stationary the movable reflector will pass through the beam of light so as to entirely intercept the same. When the beam has been thus masked from the tilting reflector the latter is then returned to its initial position.

The two reflectors are also preferably so coördinated that the movable reflector passes out of the beam of light an instant before the film commences to again move, so that before the beginning of the feeding operation the stationary picture will be reflected by the tilting reflector, which will therefore be held stationary, but as the film begins to move the tilting reflector will commence its automatic change of angle to compensate for that movement. Finally the two reflectors are preferably so coördinated that after the tilting reflector has come to rest and is reflecting the stationary image of the picture whose movement the tilting reflector has followed, the movable reflector will intercept the light beam so as to reflect on the screen the image of the succeeding picture which will also be stationary, and will thereafter, in its path through the light beam, cut off the rays from the stationary picture that are being reflected by the tilting reflector. Then when the tilting reflector has been returned to its initial position and the movable reflector once again passes out of the light beam the tilting reflector will reflect the stationary image of the same succeeding picture and will follow that picture through its path during the feed movement which forthwith takes place. In this way I provide for a dissolving effect of one picture into the other during the time that the film is held stationary, and two pictures thereon are in position within the beam of light.

In order that my invention may be better understood attention is directed to the accompanying drawings forming part of this specification, and in which:

Figure 1 is a diagrammatic vertical sectional view, illustrating the principle of my invention, and showing the bodily movable reflector in the beam of light so as to mask the tilting reflector;

Fig. 2 is a similar view showing the two reflectors, looking at the same from the front;

Fig. 3 is a view similar to Fig. 1, showing the bodily movable reflector out of the beam to unmask the tilting reflector; and Fig. 4 is a diagram of the cam for actuating the tilting reflector and showing thereon the sequence of movement of the film and the two reflectors.

In the above views corresponding parts are represented by the same numerals.

A motion picture film 1 passes through a film gate 2, the opening in which is long enough to permit two pictures to be presented to the light beam 3 from any usual source of light.

The film is fed intermittently in any suitable way, as by a sprocket 4, moved intermittently by a star and pin mechanism 5 and 6, being held fixed during the periods of rest by a pawl 7. Preferably the feed mechanism is such that the periods of movement will exceed the periods of rest, and with the mechanism shown the feed movement occupies two-thirds of the time and the periods of rest one-third of the time. Comparing such a feed movement with an ordinary intermittent feed machine having a 3 to 1 feed and working at a speed of sixteen per second, I effect the feed movement in one-twenty-fourth of a second as compared with one-sixty-fourth of a second, and hence the wear and tear on the film is the same as if the picture with the assumed machine were projected at the rate of six and two-fifths per second. Thus with my machine the wear on the film is very largely reduced. Below the film is a tilting reflector 8, intercepting the light beam and reflecting the same to the objective 9. The reflector is mounted to swing on an axis which is coincident with the reflecting surface, so that the focal distance between the objective and film will not be changed, nor will any other optical factor be varied. The reflector 8 is operated by a cam 10 so as to compensate for the movement of the film, the roller 11 which engages the cam being held in close engagement therewith by a spring 12. In order to reflect the image when the film is stationary I prefer to use a second reflector 13, whose angle does not change, but which is movable into and out of the light beam, preferably also to mask the reflector 8 while it is returning to its initial position. Thus the second reflector 13 may be carried by a shaft 14 driven by gearing 15 from the cam 10, as shown. The beam from the movable reflector 13 is shown as projected through a second objective 16, but it will be evident that a single objective may be used, suitable optical devices being used to project the beam thereto successively from the two reflectors. Any suitable device for properly framing the picture may be employed, such, for example, as the screen 17 interposed in the light beam and having two apertures as shown, each equal to a single picture. As will be explained, there is preferably a period in the cycle of operation, where the film is stationary and images are being projected from both reflectors, and during this period it becomes readily possible to transfer the beam entering the single objective from one reflector to the other, as would be obvious to those skilled in the art. The intermittent feed mechanism is so coördinated with the reflectors that they work in proper sequence. The preferred cycle is more clearly shown in Fig. 4, in which the dotted line represents a true circle. For the period marked 240° the film is being moved by the feed mechanism and the reflector 8 is being tilted so that its change of angle will compensate for the movement of the film and hold the image stationary. During the period marked 120° the film is at rest, its movement being arrested very gradually. During the early portion of the period of rest the tilting reflector 8 is also arrested so that this reflector will reflect the stationary image, and hence the cam is provided with a concentric portion corresponding with the sector marked 25° at the right of Fig. 4. As shown the reflector 13 moves into the light beam during the time that the stationary image is being reflected by the reflector 8, and entirely intercepts the beam during the period of 25° following the coming of the film to rest. When the reflector has entirely cut the beam to mask the reflector 8, the latter is moved back to its initial position, the cam providing 70° of its circumference for this purpose, so that the return movement is gradual. When the reflector 8 has returned to its initial position there is a small portion of the cam marked 25° at the left where the cam is concentric, and therefore, during the movement of the reflector 13 out of the beam, the reflector 8 will reflect the stationary picture. The cam does not commence to tilt the reflector 8 until the reflector 13 is entirely withdrawn, and therefore the cam is provided with a second concentric portion referred to.

In other words, the cam is provided with a "lifting" portion of 240°, a concentric portion of 25° at its high part, a lowering portion of 70°, and a second concentric portion of 25° at its low part, but of course, these exact figures and proportions can be varied within considerable limits. The tilting reflector reflects the image when the film is moved and for a short space of time when the film is stationary, i. e., at the conclusion of a feed movement and just before the next succeeding feed movement. The movable reflector 13 cuts into the beam immediately after the film comes to rest, and entirely leaves the beam immediately before the film commences to again move. Hence, during the two sectors of 25° immediately defining the beginning and ending of each period of rest, the two reflectors 8 and 13 are jointly reflecting the beam, i. e., the reflector 8 is reflecting the picture that has come to rest after being followed in its path by the reflector 8, and the reflector 13 is beginning to reflect the next succeeding picture. Consequently the two images will dissolve or fade one into the other.

As the reflector 13 moves out of the light beam, it will gradually permit the succeeding stationary picture to be reflected by the reflector 8, ready to be followed in its movement by the reflector 8 when the next feed movement takes place.

Any desired arrangement may be employed for suitably framing the picture projected by the lens or lenses.

Having now described my invention, what I claim as new therein and desire to secure by Letters Patent, is as follows:

1. In a projecting machine the combination with a motion picture film and means for feeding the same intermittently, the periods of movement being longer than the periods of rest, of a tilting reflector arranged to reflect the image during the movement of the film, substantially as set forth.

2. In a projecting machine, the combination with a motion picture film and means for feeding the same intermittently, the periods of movement being longer than the periods of rest, of a tilting reflector arranged to reflect the image during the movement of the film, and means for projecting the image during the periods of rest, substantially as set forth.

3. In a projecting machine, the combination with a motion picture film and means for feeding the same intermittently, of a tilting reflector arranged to reflect the image during the movement of the film, and a second reflector arranged to reflect the image while the film is stationary, substantially as set forth.

4. In a projecting machine the combination with a motion picture film and means for feeding the same intermittently, of a tilting reflector arranged to reflect the image during the movement of the film, and a second reflector arranged to reflect the image while the film is stationary, the two reflectors being so coördinated that the images of succeeding pictures will merge one into the other, substantially as set forth.

5. In a projecting machine, the combination with a motion picture film, and means for feeding the same intermittently, of a tilting reflector arranged to reflect the image during the movement of the film, and a second reflector arranged to reflect the image of the succeeding picture while the film is stationary, substantially as set forth.

6. In a projecting machine the combination with a motion picture film and means for feeding the same intermittently, of a tilting reflector arranged to reflect the image during the movement of the film, and a rotating reflector arranged to reflect the image while the film is stationary, substantially as set forth.

7. In a projecting machine, the combination with a motion picture film and means for feeding the same intermittently, of a tilting reflector arranged to reflect the image during the movement of the film, and a rotating reflector arranged to reflect the image while the film is stationary, the two reflectors being so coördinated that the images of succeeding pictures will merge one into the other, substantially as set forth.

8. In a projecting machine, the combination with a motion picture film and means for feeding the same intermittently, of a tilting reflector arranged to reflect the image during the movement of the film, and a rotating reflector arranged to reflect the image of the succeeding picture while the film is stationary, substantially as set forth.

9. In a projecting machine the combination with a motion picture film and means for feeding the same intermittently, of a tilting reflector arranged to reflect the image during the movement of the film, and a second reflector arranged to reflect the image while the film is stationary, and also arranged to mask the tilting reflector, substantially as set forth.

10. In a projecting machine, the combination with a motion picture film and means for feeding the same intermittently, of a tilting reflector arranged to reflect the image during the movement of the film, a second reflector arranged to reflect the image while the film is stationary, and means to return the tilting reflector to its initial position while the second reflector is intercepting the light beam, substantially as set forth.

11. In a projecting machine the combination with a motion picture film and means for feeding the same intermittently, of a tilting reflector arranged to reflect the image during the movement of the film, and a second reflector arranged to reflect the image while the film is stationary, the two reflectors being so coördinated that the images of succeeding pictures will merge one into the other, and means for returning the tilting reflector to its initial position while the second reflector is intercepting the light beam, substantially as set forth.

12. In a projecting machine the combination with a motion picture film and means for feeding the same intermittently, of a tilting reflector arranged to reflect the image during the movement of the film, and a second reflector arranged to reflect the image of the succeeding picture while the same is stationary, and means for returning the tilting reflector to its initial position while the second reflector is intercepting the light beam, substantially as set forth.

13. In a projecting machine, the combination with a motion picture film, means for feeding the same intermittently, of a tilting reflector arranged to reflect the image for a portion of the time that the same is stationary, to then follow the image through its movement to compensate therefor and to reflect the same image when it again comes to rest, and a second reflector arranged to reflect the image while the film is stationary, substantially as set forth.

14. In a projecting machine, the combination with a motion picture film, means for feeding the same intermittently, of a tilting reflector arranged to reflect the image through its movement to compensate therefor and to reflect the same image when it again comes to rest, and a second reflector arranged to reflect the image of the succeeding picture while the film is stationary, substantially as set forth.

15. In a projecting machine, the combination with a motion picture film, means for feeding the same intermittently, of a tilting reflector arranged to reflect the image through its movement to compensate therefor, and to reflect the same image when it again comes to rest, and a second reflector arranged to reflect the image of the succeeding picture while the film is stationary and also to mask the tilting reflector during its return to its initial position, substantially as set forth.

16. In a projecting machine, the combination with a motion picture film and means for feeding the same intermittently, the feeding movements being longer than the periods of rest, of a tilting reflector arranged to reflect the image during the movement of the film, and a second reflector arranged to reflect the image while the film is stationary, substantially as set forth.

17. In a projecting machine the combination with a motion picture film and means for feeding the same intermittently, the feeding movements being longer than the periods of rest, of a tilting reflector arranged to reflect the image during the movement of the film, and a second reflector arranged to reflect the image while the film is stationary, the two reflectors being so coördinated that the images of succeeding pictures will merge one into the other, substantially as set forth.

18. In a projecting machine, the combination with a motion picture film, and means for feeding the same intermittently, the periods of movement exceeding the periods of rest, and each feed movement gradually accelerating from rest to its maximum, and then gradually diminishing to rest, of a tilting reflector arranged to reflect the image during the movement of the film, and a second reflector arranged to reflect the image while the film is stationary, substantially as set forth.

19. In a projecting machine, the combination with a motion picture film and means for feeding the same intermittently, the periods of movement exceeding the periods of rest, and each feed movement gradually accelerating from rest to its maximum, and then gradually diminishing to rest, of a tilting reflector arranged to reflect the image during the movement of the film, and a second reflector arranged to reflect the image while the film is stationary, the reflector being so coördinated that the images of succeeding pictures will merge one into the other, substantially as set forth.

This specification signed and witnessed this 10th day of June, 1914.

FRANK L. DYER.

Witnesses:
ANNA E. RENTON,
HARRY PFOST.